United States Patent Office 3,535,219
Patented Oct. 20, 1970

3,535,219
PROCESS FOR THE PREPARATION OF
PHOSPHONIOALKANE SULFONATES
Fred Jaffe, Cincinnati, and Ted J. Logan, Colerain Township, Hamilton County, Ohio, assignors to The Procter & Gamble Company, Cincinnati, Ohio, a corporation of Ohio
No Drawing. Filed Nov. 28, 1967, Ser. No. 686,341
Int. Cl. B01j 1/10; C07c 143/68
U.S. Cl. 204—158                                    10 Claims

ABSTRACT OF THE DISCLOSURE

This invention relates to the reaction of tertiary phosphines with unsaturated organic halides or pseudo-halides and the subsequent reaction with an alkali metal or ammonium bisulfite to obtain tris(organo)phosphonioalkane sulfonates.

BACKGROUND OF THE INVENTION

Previous methods of preparation of phosphonialkane sulfonates involved the reaction of a tertiary phosphine with an alkane sultone according to the following reaction $$R_3P + R'\underset{\underset{O}{\vert\_\_\vert}}{\overset{R''\quad R''}{\diagdown\diagup}}SO_2 \longrightarrow R_3P^+ - \overset{R''\quad R''}{\underset{}{\diagdown\diagup}}R'-SO_3^-$$

The above method of preparation is described by Gaertner in U.S.P. 2,828,332. In the above described synthesis it was necessary to use an alkane sultone which in itself was not only complicated to prepare but expensive to use because of its difficult preparation.

SUMMARY OF THE INVENTION

This invention relates to the reaction of organic tertiary phosphines with unsaturated organic halides and pseudo-halides to obtain alkenyltris(organo)phosphonium halides or pseudo-halides, which product is subsequently reacted with an alkali metal or ammonium bisulfiate in the presence of a reaction initiator to obtain tris(organo) phosphonioalkane sulfonates.

A further object of this invention is to provide a process for the preparation of phosphonioalkane sulfonates which is more economical than those processes for preparation of compounds of this type heretofore known.

An additional object of this invention is the preparation of phosphonioalkane sulfonates useful in detergency applications and as biological toxicants.

The objects of this invention are accomplished by a reaction of an organic tertiary phosphine of the following general formula $$R^1 - \overset{R^3}{\underset{R^3}{\overset{\vert}{P}}}$$

wherein $R^1$, $R^2$ and $R^3$ each are selected from the group consisting of alkyl, aryl, alkaryl, aralkyl, cyclic or heterocyclic groups having from 1 to about 30 carbon atoms and which hetero atoms may be sulfur or oxygen, with an organic halide or pseudo-halide of the following formula $$X - \overset{H}{\underset{H}{\overset{\vert}{C}}} - (CH_2)_n - \overset{R^6}{\underset{}{\overset{\vert}{C}}} = C\overset{R^4}{\underset{R^5}{\diagup}}$$

wherein $R^4$ and $R^5$ each may be selected from the group consisting of hydrogen and alkyl, aryl, alkaryl, aralkyl, cyclic and heterocyclic groups having from 1 to about 30 carbon atoms, wherein the hetero atoms may be sulfur or oxygen, wherein methylene and arylene linkages in the alkyl, alkaryl, and aralkyl groups may be replaced by from 0 to about 10 thio or ether linkages, wherein $R^6$ is hydrogen or a short chain alkyl group having from 1 to about 5 carbon atoms, wherein X is selected from the group consisting of chlorine, bromine, iodine, the methyl sulfonate group and the tosylate group, and wherein $n$ is an integer from 0 to 10. The product of this reaction is then reacted with an alkali metal bisulfite, such as sodium, potassium or lithium bisulfite, or ammonium bisulfite in the presence of a reaction initiator to form the sulfonate. The above-described synthesis steps are summarized below as:

$$R^1 - \overset{R^2}{\underset{R}{\overset{\vert}{P}}} + X - CH_2(CH_2)_n\overset{R^6}{\underset{}{\overset{\vert}{C}}} = C(R^4)(R_5) \longrightarrow [R^1 - \overset{R^2}{\underset{R^3}{\overset{\vert}{P}}}{\scriptstyle\pm} - (CH^5)_{(n+1)}\overset{R^6}{\underset{}{\overset{\vert}{C}}} = C(R^4)(R^5)]X^-$$

$$\Big\downarrow \text{HSO}_3^-/\text{Reaction Initiator}$$

$$R^1 - \overset{R^2}{\underset{R^3}{\overset{\vert}{P}}}{}^+ - (CH_2)_{(n+1)}\overset{R^6}{\underset{H}{\overset{\vert}{C}}}C(R^4)(R^5)SO_3^-$$

This novel synthesis of tris(organo)phosphonioalkane sulfonates eliminates the necessity of using expensive sultones as the starting material. This feature, as a result, makes the synthesis of tris(organo)phosphonioalkane sulfonates easier to accomplish and less expensive due to the ability to employ reactants which are less expensive than alkane sultones.

Phosphines

The organic tertiary phosphines useful in accomplishing the objects of this invention have the general formula $$R^1 - \overset{R^2}{\underset{R^3}{\overset{\vert}{P}}}$$

wherein $R^1$, $R^2$ and $R^3$ each may be alkyl, aryl, aralkyl, alkaryl, cyclic or heterocyclic groups having from 1 to about 30 carbon atoms and which hetero atoms may be sulfur or oxygen.

Suitable groups wherein $R^1$, $R^2$ and $R^3$ are alkyl or aralkyl include the following: methyl, ethyl, propyl, isopropyl, n-butyl, isobutyl, n-pentyl, 2,3-dimethylpentyl, n-hexyl, 3-ethylhexyl, n-octyl, isooctyl, n-nonyl, n-decyl, n-undecyl, tripropylene, n-dodecyl, tetrapropylene, n-tridecyl, n-tetradecyl, 6-hexyltetradecyl, 5-ethyl-2,2-dimethyltridecyl, n-pentadecyl, 2,5,8,11-tetraethylpentadecyl, n-hexadecyl, n-octadecyl, eicosyl, triacontyl, 4-phenylbutyl, 6-naphthylhexyl, and 12-phenyldodecyl.

Suitable groups wherein $R^1$, $R^2$ and $R^3$ are aryl or alkaryl include the following: phenyl, biphenyl, triphenyl, napthyl, anthracyl, phenanthryl, 3-butylphenyl, 3-dodecylphenyl, tetrapropylenephenyl, 8-hexylnaphthyl, 8-benzylnaphthyl and 9-dodecylnaphthyl.

Suitable groups wherein $R^1$, $R^2$ and $R^3$ are cyclic groups include the following: cyclopentyl, cyclohexyl, cycloheptyl, methylcyclohexyl, dodecylcyclohexyl, cyclopentyltetradecyl, and cyclooctyl; or when $R^1$, $R^2$ and $R^3$ are heterocyclic include the following: furanyl, thiophenyl, pyranyl, and thiopyranyl.

Preferred phosphine compounds are dimethyldodecylphosphine, diethyldodecylphosphine and dimethylhexadecylphosphine, Other preferred phosphines are those having two alkyl groups each with from 1 to about 5 carbon atoms and with the third alkyl group being a long chain alkyl group having from about 8 to about 22 carbon atoms and those having two alkyl groups each with from about 18 to about 22 carbon atoms and with the third alkyl group being an alkyl group having from 1 to about 10 carbon atoms. Another preferred phosphine is triphenylphosphine. Tertiary phosphines in which $R^1$, $R^2$ and $R^3$ are all short chain alkyl groups having from 1 to about 5 carbon atoms are also preferred.

The phosphine compound used in the reaction can be present in an amount that is stoichiometrically equivalent to the unsaturated organic halide or pseudo-halide in the quaternization step; however, this is not critical and either reactant can be present in excess. In fact, the unsaturated organic halide or pseudo-halide can be used as the solvent in the reaction and thus can be present in great excess. The preferred ratio of reactants is that in which the organic halide or pseudo-halide is present in excess up to about 10 moles of organic halide or pseudo-halide per mole of phosphine.

Tertiary phosphines are required as a reactant in this development. If secondary or primary phosphines are used, undesirable side products may be produced; for example, the phosphorus compound may react with the double bond of the alkene rather than by quaternization of the phosphine. With tertiary phosphines side reactions are not as prevalent and greater yields of the desired product occur.

Halo and pseudo-halo alkenes

The halo and pseudo-halo alkenes which are used to quaternize the tertiary phosphines in the first step in this invention are of the following general formula:

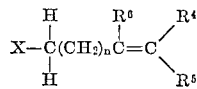

wherein $R^4$ and $R^5$ each are selected from the group consisting of hydrogen and alkyl, aryl, alkaryl, aralkyl, cyclic and heterocyclic groups having from 1 to about 30 carbon atoms, wherein the hetero atoms, when the heterocyclic groups are present, may be sulfur or oxygen, wherein the methylene linkages or arylene linkages in the alkyl, alkaryl, and aralkyl groups may be replaced by from 0 to about 10 thio or ether linkages, wherein $R^6$ is hydrogen or a short chain alkyl group having from 1 to 5 carbon atoms, wherein X is a halogen or a pseudo-halogen and wherein $n$ is an integer from 0 to 10.

Where $R^4$ and $R^5$ are each alkyl or aralkyl, suitable groups include the following: methyl, ethyl, propyl, isopropyl, n-butyl, isobutyl, n-pentyl, 2,3-dimethylpentyl, n-hexyl, 3-ethylhexyl, n-octyl, isooctyl, n-nonyl, n-decyl, n-undecyl, tripropylene, n-dodecyl, tetrapropylene, n-tridecyl, n-tetradecyl, 6-hexyltetradecyl, n-pentadecyl, 2,5,8,-11-tetraethylpentadecyl, n-hexadecyl, n-octadecyl, eicosyl, triacontyl, 4-phenylbutyl, 6-naphthylhexyl, and 12-phenyldodecyl.

Suitable groups wherein $R^4$ and $R^5$ each are aryl or alkaryl include the following: phenyl, biphenyl, triphenyl, naphthyl, anthracyl, phenanthryl, 3 - butylphenyl, 3-dodecylphenyl, tetrapropylenephenyl, 8-hexylnaphthyl, 8-benzylnaphthyl and 9-dodecylnaphthyl.

Where $R^4$ and $R^5$ are cyclic groups, suitable groups for use are: cyclopentyl, cyclohexyl, cycloheptyl, methylcyclohexyl, dodecylcyclohexyl, cyclopentyltetradecyl, and cyclooctyl; or when $R^4$ and $R^5$ are heterocyclic, the following groups are included: furanyl, thiophenyl, pyranyl, and thiopyranyl.

Where $R^6$ is a short chain alkyl group, suitable groups are methyl, ethyl, propyl, isopropyl, butyl and pentyl.

Preferred alkenes are those wherein $R^4$, $R^5$ and $R^6$ each are hydrogen and $n$ is 0, e.g., allyl. Also preferred alkenes are those in which $R^4$ and $R^5$ are hydrogen and $R^6$ is methyl or ethyl and those in which $R^4$, $R^5$ and $R^6$ are short chain groups having from 1 to 3 carbon atoms, e.g., methyl, ethyl and propyl groups.

Where either $R^4$ and $R^5$ are alkyl, alkaryl, or aralkyl groups in which thio or ether linkages replace methylene or arylene linkages, suitable groups are as follows: 4-oxahexyl, 2,5,8-trioxahexadecyl, 3-thiopentyl, 4,8,12,16-tetrathioeicosyl and 3-thio-6-oxadecyl. In addition, where sulfur exists within the chain higher oxidation states of sulfur such as the corresponding sulfoxides are acceptable for the purposes of this invention. A generalized formula for these compounds is given as follows:

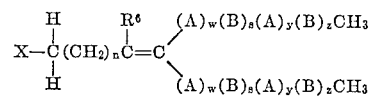

where A is a methylene or an arylene group, where B is either sulfur or oxygen, where $w$ and $y$ each are integers and may range from 1 to 29 with the total number of carbon atoms in each $R^4$ and $R^5$ group being 30 or less, where $s$ and $z$ are integers and may be 0 or 1, with the sum of $s$ and $z$ being 10 or less, where X is a halogen or a pseudo-halogen and where $n$ is an integer from 0 to 10.

Suitable halogens for the purpose of this invention are chlorine, bromine and iodine. Suitable pseudo-halogens are the methyl sulfonate group, $CH_3SO_3$—, or the tosylate group, $CH_3C_6H_4SO_3$—. The preferred substituent is chlorine.

Reaction of the tertiary phosphine with halo or pseudo-halo alkenes

The reaction of the halo and pseudo-halo alkenes with the tertiary phosphines hereinbefore described is conducted in an atmosphere of argon although other inert gases such as nitrogen or helium are also suitable. The absence of oxygen is necessary for the purposes of this invention because the phosphines oxidize readily.

The reaction medium may be an excess of the halo or pseudo-halo alkene or a solution of the halo or pseudo-halo alkene in benzene. Other solvents which can be used and are also preferred are saturated hydrocarbons, e.g., pentane or cyclohexane; aromatic hydrocarbons, e.g., toluene or xylene; and ethers such as tetrahydrofuran, dimethyl ether, dioxane or 1,2-dimethoxyethane. The phosphines can also be dissolved in the above solvents, or the reaction can run with no solvent at all with the halo or pseudo-halo alkene being added last since the order of addition of the reactants is not important.

The reaction of the tertiary phosphine with the halo or pseudo-halo alkene can be conducted at a temperature of from about 0° C. to about 250° C. The range of from about 20° C. to about 150° C. is preferred. The operation may be conducted under pressure when necessary depending on the reactants, solvents and reaction conditions, since it is desirable to maintain all components in a liquid state.

The reaction time is normally around 1 to about 3 hours depending on the conditions utilized. The reaction can be followed using standard gas chromatographic techniques to detect the point at which the starting materials have been utilized.

Although in itself the reaction product of the above reaction is not the object of this invention, but rather the preparation of the sulfonated derivative, the intermediate is in itself a useful product. Compounds of the above type have bacteriostatic activity (see G. M. Kosolapoff, Organo-Phosphorus Compounds, John Wiley & Sons, New York, 1950, p. 86) and therefore can be used as biological toxicants.

Bisulfite addition

The alkali metal or ammonium bisulfite is added in aqueous media to the product from the above reaction after the first step (quaternization) is completed. The quaternary, shown below:

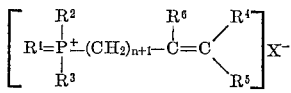

is obtained from the above-described reaction of the tertiary phosphine with the halo or pseudo-halo ($R^1$, $R^2$, $R^3$, $R^4$, $R^5$, $R^6$, X and $n$ are as defined above). The alkali metal or ammonium bisulfite can also be added in the form of an aqueous alcoholic solution, e.g., in methanol, ethanol, or isopropanol/water mixtures. Aqueous media is preferred. The concentration range of the bisulfite dissolved in the aqueous and the alcohol/water media is from about 1% to the limit of the solubility of the bisulfite in the particular medium used.

Reaction initiators

It is necessary in the practice of this invention to initiate the reaction of the bisulfite and the alkenyltris(organo)-phosphonium halide or pseudo-halide. The initiation which is necessary is the formation of a free radical. The free radical formed then reacts with the alkenyltris(organo)-phosphonium halide or pseudo-halide at the site of the unsaturation resulting in the production of a tris(organo)-phosphonioalkane sulfonate. The product, the tris-(organo)phosphonioalkane sulfonate, is preferably worked up by removal of any volatile materials present in the system.

The reaction initiators which can be used for the purposes of this invention are those which initiate the production of free radicals. These initiators can be γ-cell irradiation, as from a $Co^{60}$ cell, ultraviolet irradiation as from a mercury lamp, or a chemical radical initiator. Where γ-cell irradiation or ultraviolet irradiation is used to react will proceed readily at room temperature. Reaction times using either γ-cell irradiation or ultraviolet irradiation as the initiator range from a few minutes to several hours depending on the strength or intensity of the source of irradiation.

As has already been indicated, chemical initiators are also suitable as reaction initiators. These should be of the type which form free radicals. A chemical initiator of a nonoxidizing type is preferred since under certain conditions oxidation of the sulfite to sulfate can occur. A suitable and preferred non-oxidizing chemical initiator is α,α'-azobis(isobutyronitrile), AIBN. Peroxides such as t-butyl hydroperoxide, benzoyl peroxide, t-butyl perbenzoate and di-t-butyl peroxide are also acceptable as reaction initiators. Only a small amount of the reaction initiator is needed and this amount ranges from about 0.01 mole percent to about 50 mole percent with respect to the alkenyltris(organo)phosphonium halide or pseudo-halide.

The preferred initiator for the purposes of this invention is the use of γ-ray bombardment with the exposure time to the irradiation of a γ-cell depending on the activity of the $Co^{60}$ source.

Although the reaction as above described is usually accomplished at atmospheric pressure when γ-cell or ultraviolet initiation is used, a higher pressure may result when higher temperatures are used. Although higher pressures may be used, the preferred reaction pressure is atmospheric pressure.

The pH of the reaction is not a critical consideration but it should be sufficiently acid to ensure the presence of the bisulfite ion. The pH may range from about 4 to about 8. The natural pH of the bisulfite solution is preferred.

The temperature of the reaction may range from a temperature of about 0° C. to a temperature of about 250° C. with the preferred range being from about 20° C. to about 150° C. With γ-ray bombardment and ultraviolet irradiation the preferred reaction temperature is room temperature. Higher temperatures are required when the reaction is initiated by chemical means to insure that the reaction proceeds smoothly. With a given initiator the temperature is chosen so that the desired reaction time corresponds to not more than a few half-lives of the initiator. Alternatively, the reaction may be carried out at a higher temperature with continuous or incremental addition of the initiator. With AIBN as the reaction initiator, the preferred temperature is about 85° C.

Tris(organo)phosphonioalkane sulfonates, the product resulting from the bisulfite addition to the alkenyltris(organo)phosphonium halide or pseudo-halide, as a class all have germicidal characteristics and will inhibit the growth of bacteria (see G. M. Kosolapoff, op. cit., p. 86). In addition the tris(organo)phosphonioalkane sulfonates are useful as surfactants (see Gaertner, supra) in a laundering composition where $R^1$ contains from about 8 to about 22 carbon atoms, where $R^2$ and $R^3$ are methyl or ethyl and $R^4$, $R^5$ and $R^6$ are hydrogens. Where two of the $R^1$, $R^2$ and $R^3$ groups each have a chain length of from about 18 to about 22 carbon atoms, as is well known in the art, the product is useful as a fabric softener to impart a softening effect to clothes washed with this material. Where $R^1$, $R^2$ and $R^3$ are each short chain alkyl, aryl, or cyclic groups, the compound is useful as a biological toxicant and can be used in germicidal compositions (see Gaertner, supra), e.g., a bar soap, where it is desired to inhibit the growth of bacteria. Where sulfur appears as a thio-linkage in the product, as hereinbefore described, the sulfur may be oxidized to the corresponding sulfoxide. As is well known in the art, sulfoxides are efficient surfactants for use in laundering compositions, alone or in combination with other anionic or nonionic surfactants, and with builders.

All parts, percentages and ratios given herein are by weight unless otherwise specified. The following examples are illustrative of the invention and should not be taken or interpreted as limiting the scope of the invention or the claims.

EXAMPLE I (a) Preparation of allyldimethyldodecylphosphonium chloride 15.0 g. (0.2 mole) of allyl chloride was dissolved in 25 ml. of benzene under argon. 7.76 g. (0.0337 mole) of dimethyldodecylphosphine was added to the above solution. The mixture of the two reactants was refluxed for 75 minutes. At that time, the volatile materials were removed by distillation under vacuum (50 mm. Hg) resulting in a viscous oil. This oil became a waxy solid on cooling to room temperature. 10.3 g. of the product was obtained corresponding to a 100% yield.

The product was analyzed using thin layer chromatographic techniques. This analysis showed that 88% was the expected product, allyldimethyldodecylphosphonium chloride ($R_f=0.46$) and 12% was an isomeric material, probably propenyldimethyldodecylphosphonium chloride ($R_f=0.19$).

When in step (a) above other tertiary organic phosphines are used, substantially equivalent results are obtained in that the corresponding allyltris(organo)phosphonium chlorides are obtained e.g., where the tertiary phosphines are combinations of the following alkyl, aryl, alkaryl, aralkyl, cyclic and heterocyclic groups: methyl, ethyl, propyl, isopropyl, n-butyl, isobutyl, n-pentyl, 2,3-dimethylpentyl, n-hexyl, 3-ethylhexyl, n-octyl, isooctyl, n-nonyl, n-decyl, n-undecyl, tripropylene, n-dodecyl, tetrapropylene, n-tridecyl, n-tetradecyl, 6-hexyltetradecyl, 5-ethyl-2,2-dimethyltridecyl, n-pentadecyl, 2,5,8,11-tetraethylpentadecyl, n-hexadecyl, n-octadecyl, eicosyl, triacontyl, 4-phenylbutyl, 6-naphthylhexyl, 12-phenyldodecyl, phenyl, biphenyl, triphenyl, naphthyl, anthracyl, phenanthryl, 3-butylphenyl, 3-dodecylphenyl, tetrapropylenephenyl, 8-hexylnaphthyl, 8-benzylnaphthyl, 9-dodecylnaphthyl, cyclopentyl, cyclohexyl, cycloheptyl, methylcyclohexyl, dodecylcyclohexyl, cyclopentyltetradecyl, cyclooctyl, furanyl, thiophenyl, pyranyl, and thiopyranil.

When in step (a) above other halo or pseudo-halo alkenes are used, substantially equivalent results are obtained in that the corresponding alkenyldimethyldodecylphosphonium halides or pseudo-halides are obtained. Suitable halo or pseudo-halo alkenes are the chlorides, bromides, iodides, methyl sulfonates or tosylates of the following alkenes: allyl, pentenyl, hexenyl, heptenyl, octenyl, nonenyl and decenyl. Substantially equivalent results are obtained in the above reaction when, in the alkenes listed above, the non-halogenated or non-pseudo-halogenated terminal carbon atom of these alkenes is mono- or disubstituted with the following alkyl, aryl, alkaryl, aralkyl, cyclic or heterocyclic groups: methyl, ethyl, propyl, isopropyl, n-butyl, isobutyl, n-pentyl, 2,3-dimethylpentyl, n-hexyl, 3-ethylhexyl, n-octyl, isooctyl, n-nonyl, n-decyl, n-undecyl, tripropylene, n-dodecyl, tetrapropylene, n-tridecyl, n-tetradecyl, 6-hexyltetradecyl, 5-ethyl-2,2-dimethyltridecyl, n-pentadecyl, 2,5,8,11-tetraethylpentadecyl, n-hexadecyl, n-octadecyl, eicosyl, triacontyl, 4-phenylbutyl, 6-naphthylhexyl, 12-phenyldodecyl, phenyl, biphenyl, triphenyl, naphthyl, anthracyl, phenanthryl, 3-butylphenyl, 3-dodecylphenyl, tetrapropylenephenyl, 8-hexylnaphthyl, 8-benzylnaphthyl, 9-dodecylnaphthyl, cyclopentyl, cyclohexyl, cycloheptyl, methylcyclohexyl, dodecylcyclohexyl, cyclopentyltetradecyl, cyclooctyl, furanyl, thiophenyl, pyranyl, thiopyranyl, 4-oxahexyl, 2,5,8-trioxahexadecyl, 3-thiopentyl, 4,8,12,16-tetrathioeicosyl and 3-thio-6-oxadecyl or when the non-terminal vinyl carbon atom of these alkenes is substituted with the following short chain alkyl groups: methyl, ethyl, propyl, isopropyl, butyl and pentyl.

When in step (a) other solvents such as toluene, xylene, pentane, hexane, cyclopentane, dioxane or dimethyl ether are substituted for benzene or when the solvent itself is eliminated substantially equivalent results are obtained.

(b) Preparation of 3-(dimethyldodecylphosphonio)-propane-1-sulfonate

A solution of 3.07 g. (0.010 mole) of the allyldimethyldodecylphosphonium chloride as prepared in step (a) was reacted with 1.56 g. (0.015 mole) of sodium bisulfite in 25 ml. of water. The reaction was conducted in a screw-cap bottle at room temperature under a blanket of argon to prevent oxidation of the sulfite. The reaction was initiated by irradiation in a Co$^{60}$ cell at a dose rate of $3.8 \times 10^5$ rads/hr. for 1½ hours.

Separation and identification of the components of the product mixture was made using thin layer chromatographic analysis techniques. This analysis showed a 64% yield of 3 - (dimethyldodecylphosphonio)propane-1-sulfonate.

When in step (b) above other bisulfites such as lithium, potassium or ammonium bisulfite are substituted for the sodium bisulfite, or when the reaction is initiated using a mercury lamp as an ultraviolet radiation source substantially equivalent results are obtained.

The resulting product, obtained in Example I, 3-(dimethyldodecylphosphonio)propane sulfonate, is useful as an efficient surfactant in a laundry detergent, alone or in combination with anionic surfactants, and with builders, as is described in a copending application, Ser. No. 533,858, filed Mar. 14, 1966, now Patent No. 3,390,095.

EXAMPLE II

Preparation of 3-(dimethylhexadecylphosphonio) propane-1-sulfonate

Allyldimethylhexadecylphosphonium chloride is prepared as in step (a) of Example I above by reacting 8.6 g. (0.03 mole) of dimethylhexadecylphosphine with 15.0 g. (0.2 mole) of allyl chloride dissolved in hexane. The product of this reaction (3.0 g., 0.0083 mole) is mixed with sodium bisulfite (2.0 g., 0.019 mole) in 25 ml. of water in a screw-cap bottle under an argon blanket. 0.016 g. (0.0001 mole) of α,α'-azobis(isobutyronitrile) is added, the reaction mixture heated to 85° C. and allowed to react for 2 hours. 3-(dimethylhexadecylphosphonio) propane-1-sulfonate is obtained.

When other chemical reaction initiators such as t-butyl-hydroperoxide or benzoyl peroxide are substituted for the α,α'-azobis(isobutyronitrile) or when potassium, lithium or ammonium bisulfite is substituted for the sodium bisulfite, substantially equivalent results are obtained.

The resulting product obtained in Example II, 3-(dimethylhexadecylphosphonio)propane sulfonate is useful as an efficient surfactant, alone or in combination with anionic or nonionic surfactants, and with builders in a laundering composition for washing clothes.

What is claimed is:

1. A process for preparation of phosphonioalkane sulfonate compounds comprising the steps of
   (a) reacting in an inert atmosphere a tertiary phosphine of the following general formula

wherein R$^1$, R$^2$ and R$^3$ are each selected from the group consisting of alkyl, aryl, aralkyl, alkaryl, cyclic and heterocyclic groups having from 1 to 30 carbon atoms, which heteroatoms may be either sulfur or oxygen, with a halo or pseudo-halo alkene of the following general formula

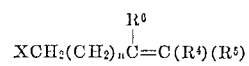

wherein R$^4$ and R$^5$ are each selected from the group consisting of hydrogen and alkyl, aryl, aralkyl, alkaryl, cyclic and heterocyclic groups, which groups contain from 1 to 30 carbon atoms and which hetero atoms may be selected from the group consisting of sulfur and oxygen, wherein methylene and arylene linkages in the alkyl, alkaryl and aralkyl groups may be replaced by from 0 to 10 thio or ether linkages, wherein R$^6$ is hydrogen or a short chain alkyl group having from 1 to 5 carbon atoms, wherein X is selected from the group consisting of chlorine, bromine and iodine atoms and tosylate and methylsulfonate groups, and wherein $n$ is an integer from 0 to 10; and (b) reacting the product of the first step with an alkali metal or ammonium sulfite, which alkali metal may be selected from the group consisting of lithium, potassium and sodium, in the presence of a reaction initiator promoting the formation of free radicals, to prepare compounds of the following formula

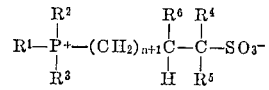

wherein R$^1$, R$^2$, R$^3$, R$^4$, R$^5$, R$^6$ and $n$ are as hereinbefore described.

2. The process of claim 1 wherein R$^1$ is an alkyl group containing from 8 to 22 carbon atoms, wherein R$^2$ and R$^3$ are each alkyl groups containing from 1 to 5 carbon atoms, wherein R$^4$ and R$^5$ are each hydrogen, wherein R$^6$ is hydrogen or methyl, wherein $n$ is 0 and wherein X is chlorine.

3. The process of claim 2 wherein the reaction initiator is γ-ray bombardment.

4. The process of claim 2 wherein the reaction initiator is a chemical reaction initiator selected from the group consisting of α,α'-azobis(isobutyronitrile), benzoyl peroxide, t-butylhydroperoxide, t-butyl perbenzoate and di-t-butyl peroxide.

5. The process of claim 1 wherein R$^1$ and R$^3$ each are alkyl groups containing from 8 to 22 carbon atoms, wherein $R^3$ is an alkyl group containing from 1 to 5 carbon atoms, wherein $R^4$ and $R^5$ are each hydrogen, wherein $R^6$ is hydrogen or methyl, wherein $n$ is 0, and wherein X is chlorine.

6. The process of claim 5 wherein the reaction initiator is γ-ray bombardment.

7. The process of claim 5 wherein the reaction initiator is a chemical reaction initiator selected from the group consisting of α,α'-azobis(isobutyronitrile), benzoyl peroxide, t-butyl-hydroperoxide, t-butyl perbenzoate and di-t-butyl peroxide.

8. The process of claim 1 wherein $R^1$ is dodecyl, wherein $R^2$ and $R^3$ are each methyl or ethyl, wherein $R^4$ and $R^5$ are each hydrogen, wherein $R^6$ is hydrogen or methyl, wherein $n$ is 0, wherein X is chlorine, and wherein the reaction initiator is γ-ray bombardment.

9. The process of claim 1 wherein $R^1$ is hexadecyl, wherein $R^2$ and $R^3$ are each methyl or ethyl, wherein $R^4$ and $R^5$ are each hydrogen, wherein $R^6$ is hydrogen or methyl, wherein $n$ is 0, wherein X is chlorine and wherein the reaction initiator is γ-ray bombardment.

10. The process of claim 1 wherein $R^1$, $R^2$ and $R^3$ are each phenyl, wherein $R^4$ and $R^5$ are each hydrogen, wherein $R^6$ is hydrogen or methyl, wherein $n$ is 0, wherein X is chlorine, and wherein the reaction initiator is γ-ray bombardment.

References Cited
UNITED STATES PATENTS

| | | | |
|---|---|---|---|
| 3,325,546 | 6/1967 | Hays | 260—606.5 |
| 3,342,714 | 9/1967 | Furrow et al. | 204—158 X |

HOWARD S. WILLIAMS, Primary Examiner

U.S. Cl. X.R.

260—503, 505